Feb. 11, 1936.    H. F. SCHMIDT    2,030,611
LUBRICATING SYSTEM
Filed July 7, 1934
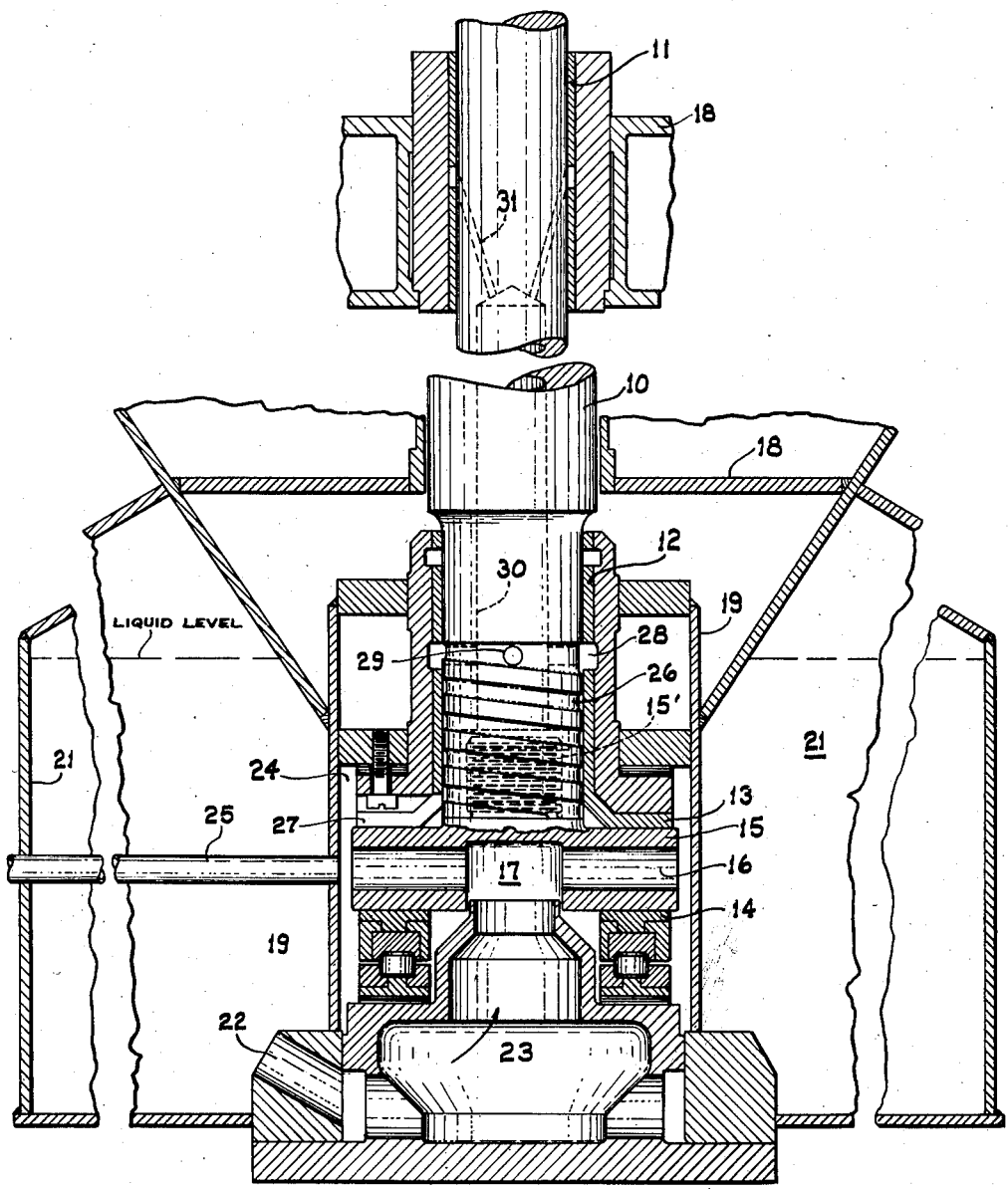
WITNESSES:
INVENTOR
HENRY F. SCHMIDT.
BY
ATTORNEY Patented Feb. 11, 1936

2,030,611

UNITED STATES PATENT OFFICE 2,030,611

LUBRICATING SYSTEM

Henry F. Schmidt, Lansdowne, Pa., assignor to Westinghouse Electric & Manufacturing Company, East Pittsburgh, Pa., a corporation of Pennsylvania Application July 7, 1934, Serial No. 734,093

10 Claims. (Cl. 184—6)

My invention relates to a lubrication system, more particularly to a lubrication system for a bearing of a vertical shaft, and it has for its object to provide an improved system of lubrication.

A further object is to provide a system of lubrication which will provide satisfactory lubrication at both relatively low speeds and relatively high speeds.

A further object is to provide a system of lubrication which provides necessary lubricant at low speeds and which restricts the pressure of lubricant supplied at relatively high speeds.

In connection with vertical shaft machines, a desirable method of lubricating the same is to provide a centrifugal impeller at the lower end of the shaft submerged in a body of lubricant. This arrangement has the advantage that the pump is self-priming, and the possibility of air binding is eliminated. A centrifugal pump has the disadvantage, however, that the pressure developed at relatively low speeds, below the speed for which the pump is designed, is inadequate to convey the lubricant to the bearings. A further difficulty resides in the fact that a relatively high pressure is developed at the higher speeds, as the impeller is designed to provide sufficient pressure at the designed speed.

In accordance with my invention, I provide a submerged centrifugal impeller at the lower end of the shaft as heretofore, and I provide a viscosity pump between the discharge of the impeller and the bearing to be lubricated. The viscosity pump preferably consists of a helical groove cut in the shaft and communicating at its lower end with the discharge of the impeller and at its upper end with the bearing to be lubricated. I have found that such an arrangement will deliver lubricant to the bearing at a relatively low speed. I have further found that such an arrangement suitably throttles the pressure of the lubricant delivered to the bearing over a wide range of higher speeds.

The above and other objects are effected by my invention as will be apparent from the following description and claims taken in connection with the accompanying drawing, forming a part of this application, in which:

The single figure is a fragmentary vertical sectional view of my novel lubrication system.

Referring to the drawing in detail, I show my invention applied to a machine having a vertical shaft. It is to be understood that my invention may be applied to any such machine, for example, a turbine driven or motor driven propeller blower or any other machine, and hence the details of the machine other than the shaft bearing and lubrication system are not shown.

The vertical shaft shown at 10 is provided with an upper journal bearing 11, a lower journal bearing 12, an upper thrust bearing 13 combined with the lower journal bearing 12, and a lower thrust bearing 14. The upper and lower thrust bearings 13 and 14 bear against the upper and lower surfaces of a thrust collar 15 at the lower end of the shaft 10. The thrust collar may be a separate piece secured to the shaft as by screw threads 15'. The thrust collar is provided with radial passages 16 and a central recess or opening 17, whereby it also serves as the impeller of a centrifugal pump. The bearings are secured in a housing structure indicated generally by the reference numeral 18, the bearings 12, 13, and 14 being enclosed in a cylindrical casing 19. The housing 18 is provided with a lubricant chamber 21 surrounding the casing 19 and communicating with the inlet 17 of the centrifugal impeller through passages 22 and a space 23. The space between the periphery of the centrifugal impeller and the casing 19 constitutes the discharge space 24 of the centrifugal pump, and a conduit 25 communicates with this space for conveying the pressure developed by the centrifugal pump to an oil governor or to any other point where this pressure may be desired.

A relatively shallow helical groove 26 is cut in the lower end of the shaft immediately above the centrifugal impeller, and constitutes, together with the cylindrical surface of the bearing 12, a viscosity pump. The rotation of the shaft relative to the cylindrical groove is such as to cause fluid to flow upwardly through the helical groove. One or more radial slots 27 are provided in the upper thrust bearing 13 to provide communication between the discharge space 24 of the centrifugal pump and the lower or inlet end of the groove of the viscosity pump. From the upper or discharge end of the groove 26, communication to a bearing to be lubricated is provided. An annular recess 28 and a plurality of radial openings 29 in the shaft 10 are provided at the upper end of the groove to convey the lubricant from the groove to a longitudinal passage 30 in the center of the shaft. Passages 31 in the shaft provide communication between said passage 30 and the upper bearing 11.

The operation of the above described mechanism is as follows: the lubricant chamber 21 is filled to the level indicated on the drawing, which is at about the upper end of the helical groove 26, so that both the centrifugal and the viscosity pump are submerged. A portion of the bearing 12 and the entire bearing 11 are above this level, and lubricant must be conveyed thereto. As operation of the machine is started and rotation of the shaft begins, the speed of the impeller 16 is too low to provide sufficient pressure for delivering the lubricant to the upper portion of the bearing 12 and to the bearing 11. The viscosity pump, however, at a relatively low speed, develops sufficient pressure to convey lubricant to the upper portion of the bearing 12 and through the passages 30 and 31 to the upper bearing 11 for lubrication.

As the speed of the machine increases, the pressure developed by the centrifugal impeller 16 increases, and at relatively highly speeds the centrifugal impeller provides a pressure which is higher than that at which it is desired to convey lubricant to the journal bearings, particularly the upper bearing 11. The lubricant discharged from the centrifugal impeller, however, must pass through the helical groove 26, and the latter, in this case, serves as an orifice or restriction to throttle the flow of lubricant, and reduces the pressure thereof to a desired value. In each case, the lubricant flows from the reservoir 21 through the centrifugal pump and then through the viscosity pump to the bearings to be lubricated, and returned to the reservoir by means not shown.

The lower portion of the bearing 12 is supplied with lubricant directly from the lubricant flowing through the viscosity pump.

I have found in practice that, in a lubricating system designed and constructed as described above, the viscosity pump begins to supply oil to the upper bearing at a speed of about 250 R. P. M., the pressure gradually increasing to 15 pounds per square inch until a speed of 600 R. P. M. is reached; and that a uniform pressure of about 15 pounds is obtained from 600 R. P. M. to 2,000 R. P. M.

From the above description, it will be seen that I have provided a system of lubrication which will deliver lubricant to the bearings down to a very low speed and which will at the same time throttle the pressure and maintain the same substantially constant over a wide range of higher speeds. It will be apparent, therefore, that this is an ideal system of lubrication for a variable speed machine, particularly a machine having a vertical shaft.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. A lubrication system for a machine comprising a centrifugal pump, a viscosity pump, and means for submerging the inlet of the viscosity pump in a body of liquid lubricant, the viscosity pump serving to provide pressure of lubricant for lubrication at low speeds and the centrifugal pump serving to provide pressure of lubricant for lubrication at higher speeds.

2. A lubrication system for a machine comprising a centrifugal pump and a viscosity pump arranged in series, the discharge of the former communicating with the inlet of the latter, and means for retaining a body of liquid lubricant and maintaining the inlet of said viscosity pump filled with liquid lubricant by gravity flow therefrom, the viscosity pump serving to provide pressure of liquid lubricant for lubrication at low speeds, and the centrifugal pump serving to provide pressure of liquid lubricant and the viscosity pump serving to reduce the pressure of said liquid lubricant at relatively high speeds.

3. A lubrication system for a machine having a vertical shaft comprising a centrifugal impeller mounted on said shaft, a viscosity pump comprising a helical groove in said shaft, the lower or inlet end of said groove being in communication with the discharge of said impeller, means adapted to contain a body of liquid lubricant, said impeller and the inlet end of said groove being submerged in said body of liquid lubricant, the upper or discharge end of said groove being in communication with a bearing to be lubricated disposed above said body of liquid lubricant.

4. In a lubrication system for a rotatable shaft, the combination of a centrifugal pump, a viscosity pump communicating with the discharge of the centrifugal pump and with a bearing to be lubricated, and means for retaining a body of liquid lubricant and maintaining the inlet of said viscosity pump filled with liquid lubricant by gravity flow therefrom, said viscosity pump serving to supply lubricant to the bearing at relatively low speeds at which the centrifugal pump does not develop sufficient pressure, and serving at higher speeds to reduce the fluid pressure developed by the centrifugal pump and delivered to said bearing.

5. In a lubrication system for a vertical shaft having journal bearings, the combination of a centrifugal pump adjacent the lower end of the shaft, means for supplying fluid to the inlet of the centrifugal pump, a viscosity pump constituted in part by the shaft adjacent the centrifugal pump, and means for submerging the inlets of the centrifugal and viscosity pumps in a body of liquid lubricant, the inlet of said viscosity pump communicating with the outlet of said centrifugal pump and the outlet of the viscosity pump communicating with the bearing to be lubricated, the viscosity pump serving to supply lubricant to the bearing at speeds too low for the centrifugal pump and serving over a wide range to throttle the pressure developed by the centrifugal pump.

6. Fluid translating apparatus comprising a centrifugal pump, a viscosity pump having its inlet communicating with the outlet of said centrifugal pump, and means for retaining a body of liquid lubricant and maintaining the inlet of said viscosity pump filled with liquid lubricant by gravity flow therefrom, and common means for driving said pumps at proportional speeds, said viscosity pump serving to provide fluid pressure at relatively low speeds and to reduce the fluid pressure developed by the centrifugal pump at higher speeds.

7. A lubrication system for a machine having a rotatable shaft and a stationary structure having a bearing for said shaft, comprising a centrifugal impeller mounted on said shaft, a viscosity pump comprising cooperating parts of said shaft and stationary structure and a helical groove in one of said cooperating parts, the inlet end of said groove being in communication with the discharge of said impeller, and means adapted to contain a body of liquid lubricant arranged so that the inlets of said pumps are submerged in the body of liquid lubricant, said bearing being disposed above said body of lubricant and said groove.

8. The combination with a vertical rotatable shaft and spaced upper and lower bearings therefor, of a lubrication system comprising a viscosity pump embodied in the lower bearing, a centrifugal pump having its discharge connected to the inlet of the viscosity pump, means for conveying lubricant from the outlet of the viscosity pump to said upper bearing, and means providing a body of liquid lubricant submerging at least the inlet end portion of said viscosity pump, the viscosity pump serving to provide pressure of liquid lubricant for lubrication at low speeds, and the centrifugal pump serving to provide pressure of liquid lubricant and the viscosity pump serving to reduce the pressure of said liquid lubricant at relatively high speeds.

9. The combination with a vertical rotatable shaft and spaced upper and lower bearings therefor, of a lubrication system comprising a viscosity pump embodied in the lower bearing, a centrifugal pump having its discharge connected to the inlet of the viscosity pump, means for conveying lubricant from the outlet of the viscosity pump to said upper bearing comprising a passage extending through the shaft, and means providing a body of liquid lubricant submerging at least the inlet end portion of said viscosity pump, the viscosity pump serving to provide pressure of liquid lubricant for lubrication at low speeds, and the centrifugal pump serving to provide pressure of liquid lubricant and the viscosity pump serving to reduce the pressure of said liquid lubricant at relatively high speeds.

10. The combination with a vertical rotatable shaft and spaced upper and lower bearings therefor, of a lubrication system including a viscosity pump, the latter comprising the lower portion of the lower bearing and the cooperating journal portion of the shaft and a helical groove in one of said cooperating portions, a centrifugal pump impeller mounted on said shaft below said groove and having its discharge in communication with the lower or inlet end thereof, means providing a body of liquid lubricant submerging said impeller and at least the inlet end portion of said groove, the upper portion of said lower bearing receiving lubricant directly from the upper or outlet end of said groove, and means for conveying lubricant from said upper or outlet end of the groove to said upper bearing, the viscosity pump serving to provide pressure of liquid lubricant for lubrication at low speeds, and the centrifugal pump serving to provide pressure of liquid lubricant and the viscosity pump serving to reduce the pressure of said liquid lubricant at relatively high speeds.

HENRY F. SCHMIDT.